C. J. LAWSON.
BOTTLE SEALING MACHINE.
APPLICATION FILED JULY 11, 1919.

1,369,034.

Patented Feb. 22, 1921.
3 SHEETS—SHEET 1.

WITNESSES:

Clarence J. Lawson
INVENTOR.

BY Robert B. Killgore
ATTORNEY

C. J. LAWSON.
BOTTLE SEALING MACHINE.
APPLICATION FILED JULY 11, 1919.

1,369,034.

Patented Feb. 22, 1921.
3 SHEETS—SHEET 3.

WITNESSES:

Clarence J. Lawson, INVENTOR.

BY
ATTORNEY

UNITED STATES PATENT OFFICE.

CLARENCE J. LAWSON, OF YONKERS, NEW YORK, ASSIGNOR TO AMOS CALLESON, OF BROOKLYN, NEW YORK.

BOTTLE-SEALING MACHINE.

1,369,034.     Specification of Letters Patent.     Patented Feb. 22, 1921.

Application filed July 11, 1919. Serial No. 310,026.

*To all whom it may concern:*

Be it known that I, CLARENCE J. LAWSON, a citizen of the United States, and resident of Yonkers, in the county of Westchester and State of New York, have invented certain new and useful Improvements in Bottle-Sealing Machines, of which the following is a specification.

My invention relates to improvements in machines for automatically affixing seals, such as crown caps, to bottles and my objects are the production of a machine in which the circle of bottle travel will be as small as possible to reduce the tendency of the bottles to rock or fall due to centrifugal action, so that the machine can be operated at higher speeds, to provide large and sturdy mechanism for raising and lowering the sealing heads and from which the sealing heads can be quickly and easily removed, to provide means for quickly adjusting the machine to bottles of different sizes and to provide means for accurately delivering bottles to the machine and removing them therefrom.

My improved machine is of the full rotary type wherein the bottles and sealing heads constantly rotate together in one direction, the uncapped bottles being automatically placed in position under the sealing heads, capped by a bottle seal automatically delivered, and then automatically removed from the machine after capping.

Figure 1:
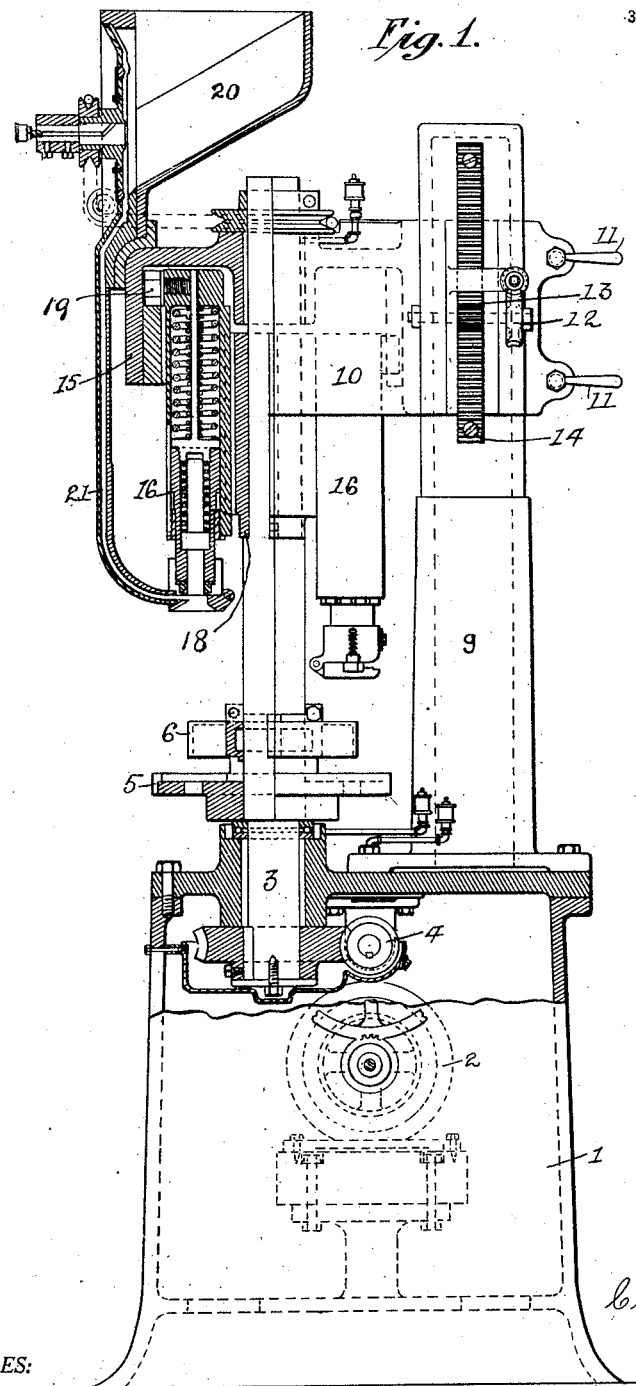
Figure 2:
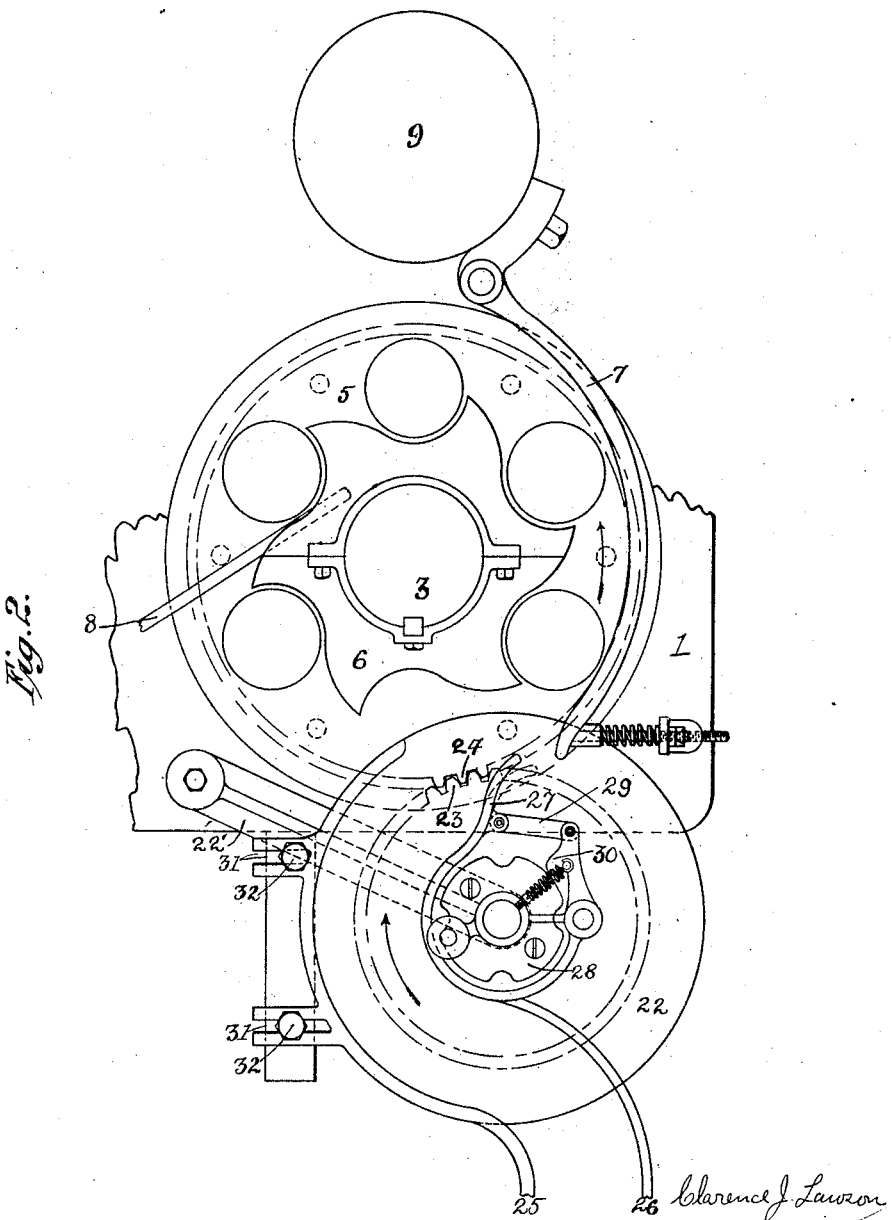
Figure 3:
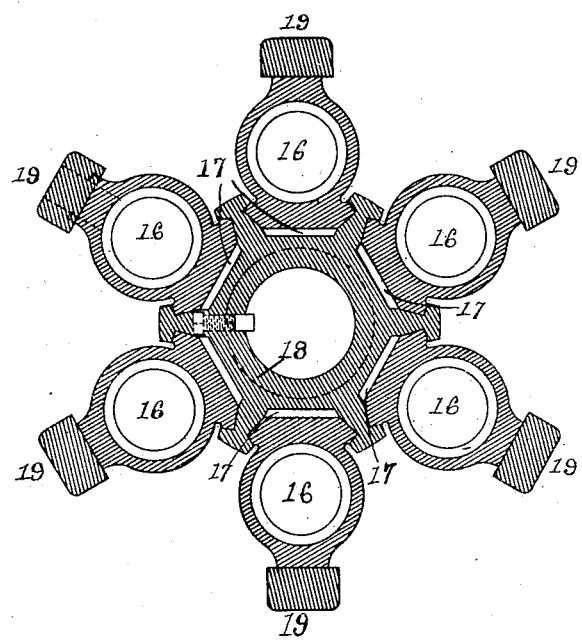
Figure 4:
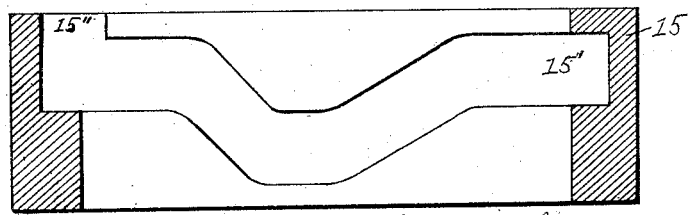

In the drawing Figure 1 is a side view, partly in section of my improved machine; Fig. 2 a plan view of the bottle table and bottle feeding device; Fig. 3 a sectional view through the sealing heads and center column; and Fig. 4 a view of a portion of the cam ring.

The machine comprises a base 1 inclosing a driving motor 2. Extending upwardly from the base is a shaft 3 which is rotated by the motor through a worm gear 4. Secured to the shaft and revolving with it is a bottle table 5, with bottle supports 6 located thereover and revolving with it. As shown in Fig. 3 these bottle supports are in the form of a star wheel whose function it is to accurately center the bottles under the sealing heads and maintain them in upright position. The star wheel is preferably split as shown to facilitate replacing one star wheel by another one when larger or smaller bottles are to be capped. A guard rail 7 is yieldably mounted outside the bottle entrance portion of the machine to guide the bottles into the pockets of the star wheel and may be swung clear of the bottle support to remove broken glass.

A fixed wiper 8 at the bottle exit portion of the machine projects into the path of travel of the bottles on the table and removes the capped bottles from the star wheel pockets.

Adjoining the shaft 3 is a column 9 which carries a bracket 10 near its upper end. This bracket and its attached parts may be raised or lowered by loosening the lock bolts 11—11 and manually revolving the worm gear 12 which in turn causes the pinion 13 to move up or down the rack 14, which is secured to the column, thereby raising or lowering the sealing heads, hopper and chute in adjusting the machine to cap bottles of different heights.

The bracket 10 carries a barrel cam 15 having a groove 15' on its inner face which groove is lower on one side than the other, the low point being the sealing point of the machine when in operation.

The cam groove has an easy down turn to seat the sealing head or the bottle gently, a dwell during which time the sealing head is affixing the bottle seal and giving time for the metal to set and a quick lift to enable the sealing head to clear the bottle prior to the removal of the latter from the machine.

The cam groove has a vertical slot 15" leading from the top of the groove to the top of the barrel cam ring at a point in the flat travel of the groove.

The sealing heads 16 are slidably mounted in dove-tail grooves 17 in the sealing head guide 18 which guide is attached to the shaft 3 by a spline and key way so that it may move up or down the shaft with the bracket 10, but always revolve with the shaft.

Each sealing head 16 is provided with a roller 19 which engages the groove 15' on the inside of the barrel 15, Fig. 1 showing a sealing head in up position at the left and one in down position (partly in dotted lines) at the right.

To insert or remove the sealing heads, the dove-tail groove is brought directly under the vertical slot 15" and the head dropped into or removed from the dove-tail groove, the roller 19 passing to the cam groove down the slot 15".

A hopper 20, mounted on the bracket 10, receives the caps in a mass and delivers them to a chute 21 which conveys them to the throat of each sealing head as it passes the delivery end of the chute during rotation.

To receive the bottles from the filling machine and deliver them to the rotating bottle table a revolving disk 22, mounted on the bracket 22', is employed. This disk is constantly rotated by a gear 23 which meshes with a gear 24 on the under side of the bottle table. Guide rails 25 and 26 steer the bottles from the filling machine (not shown) to the rotating disk 22 where they are carried in the direction shown by the arrow until they meet the movable guide rail 27 which is normally in position to restrict the passage so that bottles cannot pass. To permit the passage of bottles from the disk to the bottle table this movable rail 27 is retracted by the cam 28 which moves the rail by means of a link 29 when the nose 30 rides on a high spot of the cam.

As the machine shown has six sealing heads and the cam four high spots it is obvious that the disk 22 is revolved at one and one half times the bottle table, which assures a steady supply of bottles for capping.

While the gap between rails 26 and 27 is lessened the disk 22 will slip under the bottles thereon.

In order that bottles of different diameters may be fed the rail 25 may be manually adjusted by the slots 31 and bolts 32.

The operation of the machine is as follows:—Filled bottles are received from the filling machine onto the rotating disk 22 and carried along until the first one reaches the restricted passage between the rails 27 and 25. When the bottle table is in proper position to receive a bottle the cam 28 causes the rail 27 to move and the bottle passes to the bottle table and into a pocket in the star wheel. Meantime each sealing head has received a bottle cap from the hopper and chute and, under the action of the cam groove, is forced down upon the bottle thereby capping or sealing it. On continued rotation the cam groove raises the sealing head off the bottle and the fixed wiper 8 guides the sealed bottle off the bottle table.

By placing the cam groove on the inside of a relatively large ring I am enabled to place the sealing heads close to the center of rotation and consequently to use a bottle table of small diameter which may be rotated at a higher number of revolutions per minute without generating undue centrifugal force which would cause the bottles to rock.

I claim:—

1. A bottle capping machine comprising a base, a shaft, a bottle table on said shaft, a sealing head guide on said shaft, a sealing head movable on said guide, a cam ring provided with an internal cam groove and means connecting the sealing head and cam groove whereby the former is reciprocated on the relative rotation of shaft and cam ring.

2. A bottle capping machine comprising a base, a shaft, a bottle table on the shaft, a sealing head guide on the shaft, a sealing head slidable in the guide, a column adjacent the shaft, a bracket on said column, a cam ring provided with an internal cam groove on the bracket and means connecting the sealing head and cam groove whereby the former is reciprocated on the relative rotation of shaft and cam ring.

3. A bottle capping machine comprising a base, a shaft, a bottle table secured to the shaft, a sealing head guide on the shaft and longitudinally movable thereon, a sealing head slidable on the guide, a column adjacent the shaft, a bracket on said shaft, means for longitudinally moving said bracket on the column, a cam ring provided with an internal cam groove secured to the bracket and means connecting the sealing head and cam groove whereby the former is reciprocated on the relative rotation of shaft and cam groove.

4. A bottle capping machine comprising a base, a shaft, a bottle table secured to the shaft, a bottle support on said shaft above the table, a sealing head guide secured to the shaft, a plurality of sealing heads on said guide, a column adjacent the shaft, a bracket on said column, a cam ring provided with an internal cam groove on said bracket and means connecting the sealing heads and cam groove whereby the former are reciprocated on the relative rotation of cam ring and shaft.

5. A bottle sealing machine comprising a base, a shaft revolubly mounted thereon, a bottle table secured to said shaft, a sealing head guide secured to said shaft, a plurality of sealing heads on said guide, a column adjacent the shaft, a bracket on said column, a cam ring provided with an internal cam groove on said bracket, means for connecting sealing heads and cam groove whereby the former are reciprocated on the rotation of the shaft, a bottle seal hopper on the bracket and a chute from said hopper with its end in line with the travel of the throats of the sealing heads.

6. A bottle sealing machine comprising a base, a shaft revolving thereon, a bottle table secured to the shaft, a sealing head guide on the shaft, a plurality of sealing heads on said guide, a column adjacent the shaft, a bracket on said column, means for longitudinally moving said bracket on the column, a cam ring provided with an internal cam groove on the bracket, means for connecting the sealing heads and cam groove whereby the sealing heads are reciprocated on the rotation of the shaft, a bottle seal hopper on the bracket and a chute from said hopper with its end in line with the travel of the throats of the sealing heads.

7. A bottle sealing machine comprising a base, a shaft revoluble thereon, a bottle table secured to said shaft, a sealing head slidably mounted on said shaft, means for reciprocating said head, a feed disk adjacent the bottle table, means for rotating said disk, guide rails over said disk, one of which is movable with respect to the other to open and close the bottle passage, and means for moving said rail.

8. A bottle capping machine comprising a base, a shaft revoluble thereon, a bottle table secured to said shaft, a sealing head slidably mounted on said shaft, means for reciprocating said sealing head, a feed disk adjacent the bottle table, guide rails over said disk one of said rails being movable toward or away from the other to open and close the bottle passage, means for moving said rail and the other of said rails being adjustable to or from the first whereby bottles of different diameters may be fed.

9. A bottle sealing machine comprising a base, a shaft revoluble thereon, a bottle table secured to the shaft, a sealing head slidably mounted on the shaft, means for reciprocating the sealing head, a feed disk adjacent the bottle table, a gear on the bottle table, a gear on the feed disk meshing with the bottle table gear, a pair of guide rails over the disk, one of said rails being movable toward and away from the other to open and close the bottle passage, a cam secured to the disk and means connecting the cam and movable rail to open and close the bottle passage.

10. A bottle capping machine comprising a base, a shaft, a bottle table on said shaft, a sealing head guide on said shaft, a sealing head movable on said guide, a cam ring provided with an internal cam groove and a vertical slot from the upper edge of the ring to the groove, means on the sealing head adapted to enter the cam groove through the slot whereby the head is reciprocated on the relative rotation of head and cam ring.

Signed at New York city, in the county of New York and State of New York.

CLARENCE J. LAWSON.